May 6, 1952     W. A. MULHERN     2,595,873
HUB CAP CLIP AND MOUNTING
Filed Nov. 5, 1947
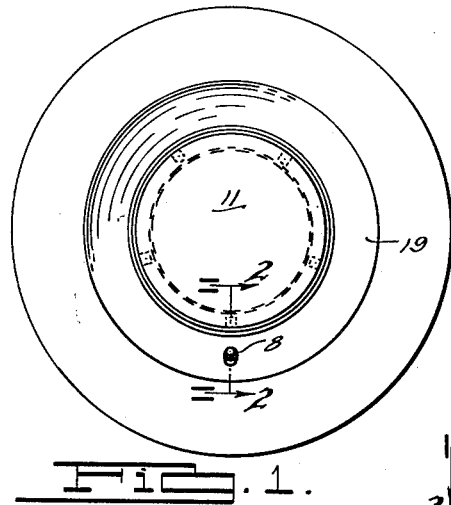
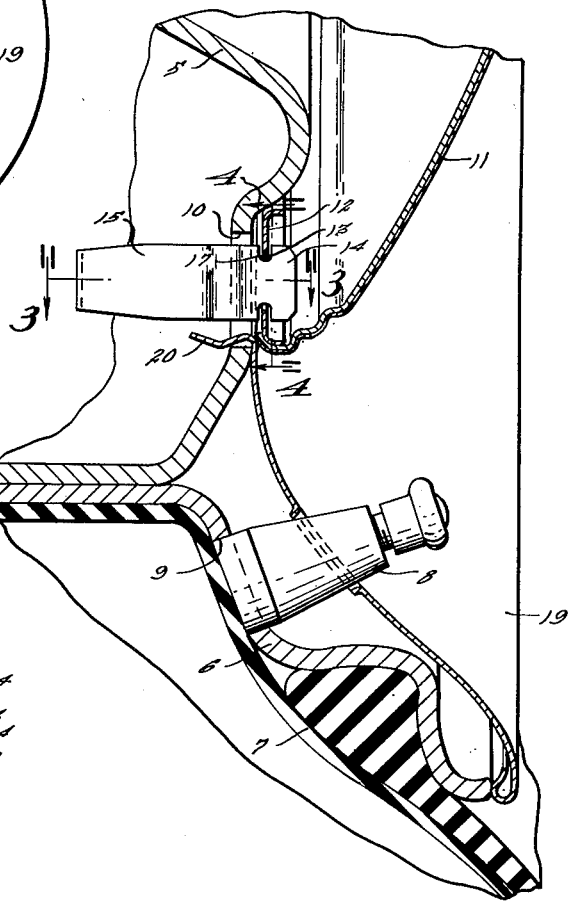
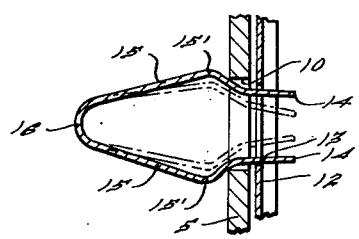
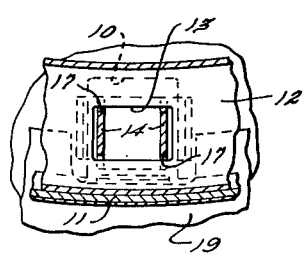
INVENTOR.
William A. Mulhern
BY
Harness and Harris
ATTORNEYS.

Patented May 6, 1952

2,595,873

UNITED STATES PATENT OFFICE 2,595,873

HUB CAP CLIP AND MOUNTING

William A. Mulhern, Detroit, Mich., assignor to Chrysler Corporation, Highland Park, Mich., a corporation of Delaware Application November 5, 1947, Serial No. 784,111

8 Claims. (Cl. 301—37)

This invention relates to hub caps for motor vehicle wheels and more particularly to a hub cap clip and mounting for securing the hub cap to the wheel of a motor vehicle.

Various means have been provided in the past for the attachment of hub caps on a vehicle wheel in an endeavor, not only to protect the axle or the extremities of the axle but also to dress up the wheels in keeping with the streamlined appointments of other parts of the vehicle. Certain essentials, however, are necessary in the provision of such devices. They must be obscured from view and so constructed that objectionable noises will not arise as a result of their use. They must be readily, easily and firmly attachable to the wheel so that they will not move with respect to the wheel when the vehicle is in motion. Further they must be capable of being manufactured at a minimum expense.

One of the principal objects of my invention is to provide a hub cap and removable clip assembly in which the clip is independently supported on the hub cap for facilitating mounting the hub cap on the wheel of a motor vehicle.

Another object of my invention is to provide an inexpensive means for securing the hub cap to the wheel of a motor vehicle, thereby facilitating, not only a minimum initial cost but also a minimum replacement cost in case of damage.

Another object of my invention is to provide on a wheel of a motor vehicle, a substantially light hub cap assembly, since the use of the light weight clip reduces the over-all weight of the cap.

Other objects of my invention are to provide a hub cap and clip assembly of this type which requires for its attachment, that the wheel portion have formed therein only a plurality of spaced openings arranged in a circular path about the axis of rotation of the wheel and to provide hub cap clips of this kind which can be conveniently assembled on a hub cap after shipment and thus permit shipment of the hub caps in closely nested arrangement.

Still another object of my invention is to provide means for mounting a hub cap on a wheel which additionally serves to secure an ornamental rim on the wheel by utilizing the same clips and openings in the wheel which mount the hub cap.

Other objects and advantages will become more apparent from the following description taken in connection with the accompanying drawings in which:

Fig. 1 is a side elevational view of a motor vehicle wheel and hub cap assembly embodying my invention.

Fig. 2 is a fragmentary sectional view taken on the line 2—2 of Fig. 1.

Fig. 3 is a fragmentary sectional view of the hub cap clip taken on the line 3—3 of Fig. 2.

Fig. 4 is a fragmentary sectional view of the hub cap clip taken on the line 4—4 of Fig. 2.

The hub cap has an inwardly extending circular flange which is provided with similarly spaced apertures for receiving hub cap clips. Each hub cap clip is of a substantially U-shaped structure having its open ends notched to be received in the apertures of the hub cap. In applying the clips to the cap the legs of the U-shaped clips are compressed, inserted into the apertures, rotated and then released. After the clips are positioned within the openings of the hub cap, the clips are snapped into the openings of the wheel as the hub cap is applied to the wheel.

Referring now to Figs. 1 and 2, I have shown a conventional motor vehicle wheel having a central circular portion 5 which has secured around its outer surface an outwardly extending circular wheel rim 6. A tire 7 is receivable in the rim 6 and is provided with a standard air inlet 8 which extends through the aperture 9 of the rim 6. The wheel portion 5 has disposed therein, in spaced relationship, a plurality of substantially rectangularly formed apertures 10 located in a circular arrangement about the center of the wheel. A circular hub cap 11 is provided with an inwardly extending circular flange 12 which has disposed therein, in spaced relationship, a plurality of substantially rectangularly formed openings 13 located in a circular arrangement about the center of the hub cap. The openings 13 are arranged to register with the opening 10 of the wheel portion 5 and adapted to receive U-shaped clips 14 for facilitating the mounting of the hub cap on the motor vehicle wheel.

Each U-shaped clip 14 comprises a pair of leg portions 15 and a connecting bight portion 16, the leg portions being provided with notches 17 at their free ends. The sections of the leg portions 15 adjacent the bight 16 diverge toward the free ends of the leg portions to a location intermediate the length of the clip and the next adjacent sections of the leg portions 15 converge in a similar direction. This construction provides a vertex 15' in each of the leg portions 15 which establish the maximum span of the clip.

The distance between the inner extremities of the notches 17 of each leg portion 15 of the clip 14 is a great deal less than the length of the opening 13 which is the dimension of the opening 13 extending in the direction of the circumference of the hub cap. The distance between the extremities of the notches 17 is only a small amount less than the width of the opening 13 which extends generally parallel to the diameter of the hub cap. The material of which the clip members 14 are formed is of a substantially spring-like nature, preferably comprising spring steel, and when the clip is in its normal relaxed condition the distance between the open ends of leg portions 15 is greater than either the length or width of opening 13. The widths of the open end of the legs 15 of the clip are greater than the width of the opening 13 and less than the length thereof. Therefore, in order to apply the clip 14 to the hub cap 11, it must be compressed, inserted through the opening 13 while the width of the legs of the clip are arranged longitudinally of the opening 13, rotated through a 90° angle and released. Expansion of the clip 14 will force the legs 15 against the periphery of the opening 13 thereby seating the metal of the flange 12 surrounding the opening 13 in the notches 17, substantially as shown in Fig. 2.

The apertures 10 are positioned in the wheel portion 5 to align with the openings 13 of the flange 12 and are adapted to receive the closed end portion of the U-shaped clip 14. As shown in Fig. 3, when the clip 14 is inserted into the aperture 10, pressure against the verticles 15' of the leg portions 15 by the walls of the aperture 10 causes the clip to be compressed allowing insertion of the maximum span of the clip through the opening 10 after the clip has been inserted to the point where the verticles 15' have passed through the aperture 10 the clip expands. This causes the clip 14 to be snapped into the aperture 10. The engagement of the converging sections of the legs 15 of the clips 14 with the edges of the aperture 10 resiliently urges the cap and wheel together in firm contacting relationship. It should be noted, that in order that this may be accomplished, that the distance between the verticles 15', before the clip is inserted in the aperture 10, should be greater than the corresponding dimension of the aperture 10. It should also be noted that when this snapping operation takes place the open ends of the leg portions 15 are not disengaged from the opening 13 but merely slide with respect to the longitudinal edges of the opening 13 which are engaged in the notches 17. By this snapping operation, as heretofore described, the hub cap 11 is securely fitted to the circular wheel portion 5. By positioning the clips 14 so that they are compressible circumferentially with respect to wheel portion 5 any radial pressure exerted upon the hub cap 11 will be received by the noncompressible face of the clip 14.

By using a plurality of clips 14 uniformly spaced on the flange 12, the hub cap is tightly held against the wheel portion 5, thereby eliminating any rattles or vibratory noises as a result of the motion of the motor vehicle. Any type of obstructions commonly encountered while driving, such as sticks and stones, will not dislodge the hub cap from the wheel since this pressure excited against the hub cap will be applied edgewise on the legs of the clips and not in a manner to compress the sides of the clip together.

The hub cap and clips are readily accessible by merely using a prying tool to disengage the cap from the wheel while the clips remain on the cap. After this is done the clips may be removed by compressing their legs together, rotating them 90° and them merely withdrawing them from the apertures 13 in the flange of the hub cap. By using the clips 14 approximately the same amount of material is used compared to the conventional amount used for securing a hub cap to a wheel. The clips 14, however, do not use any means such as welding or nuts and bolts for securing them to the hub caps, therefore, the weight of the hub cap assembly is less as well as is the cost, not only of the initial clips, but also of any clips needed for replacement after damage resulting from collision.

It should be noted that use of a detachable hub cap clip facilitates stacking of the hub caps as well as shipment thereof. By removing the clips the caps may be neatly and compactly stacked one above the other and shipped in this fashion thereby requiring much less shipping space.

An ornamental rim 19 may be secured to the wheel portion 5 by utilizing the apertures 10. This may be accomplished by providing the rim 19 with a plurality of spaced inwardly extending flanges 20. These flanges are inserted in the apertures 10 before the clip 14 is inserted therein. After the clip has been inserted and the hub cap 11 is fitted to the wheel portion 5, the periphery of the hub cap 11 engages the flanges 20 and holds the rim 19 substantially in position as shown in Fig. 2.

I claim:

1. In a vehicle wheel, the combination comprising a central circular wheel portion having a plurality of spaced apertures therein, an ornamental cap having a radially extending circular flange provided with spaced openings, said spaced openings in said flange being adapted to align with said apertures, a plurality of spring clip elements removably mounted in said openings of said flange and adapted to to be snapped into said apertures in said wheel portion, each of said clip elements comprising a contractable and expansible head portion inserted within one of said apertures of said wheel and having opposed shoulder elements engaged with correspondingly opposed boundary portions of said aperture and a pair of opposed free end portions cooperatively expansively detachably secured to said ornamental cap.

2. In a vehicle wheel, the combination comprising a central circular wheel portion having a plurality of spaced apertures therein, an ornamental cap having a radially extending portion provided with spaced openings, said spaced openings in said portions being adapted to align with said apertures, and a plurality of spring clip elements of substantially a U-shape having a might portion and a pair of opposed leg portions, said leg portions adjacent their open ends being notched to facilitate attachment of said clip elements to said portions, said clips being adapted to be snapped into said apertures in said wheel portions.

3. In a vehicle wheel including a central circular wheel portion having a plurality of spaced apertures provided therein, an ornamental cap, a circular flange extending inwardly from the periphery of said cap having spaced rectangular openings for alignment with said apertures and a plurality of substantially U-shaped spring clips each having a bight portion and a pair of opposed leg portions, said leg portions being provided with notches adjacent their open ends to facilitate insertion of said clips into said openings and rotation therein into a position to allow slidable engagement of said leg portions within said openings.

4. In a vehicle wheel, the combination comprising a central circular wheel portion having a plurality of spaced apertures therein, an ornamental cap having an inwardly extending circular flange provided with spaced openings, said spaced openings in said flange being adapted to align with said apertures, a plurality of spring clip elements removably mounted in said openings of said flange and adapted to be snapped into said apertures in said wheel portion, and an ornamental circular rim member disposed outwardly around said cap and having inwardly extending spaced flanges secured in said apertures by the periphery of said cap for retaining said rim on said wheel portion.

5. A device for securing a hub cap to a vehicle wheel comprising a generally U-shaped spring metal clip having co-extensive leg portions provided with shoulders for detachably securing said leg portions to said hub cap and including a contractable and expansible head portion for insertion in an aperture of said wheel, said head portion comprising a pair of forwardly converging sections of said spring metal clip for contracting said head portion during insertion thereof through said aperture and a pair of adjacent oppositely converging sections for urging said cap against said wheel by the expansive action of said head, the free ends of said leg portions being substantially planular and having notches for facilitating the attachment of said clip to said hub cap, the spread between said shoulders being greater than the spread between said planular ends of said leg portions.

6. In a vehicle wheel, the combination comprising a central circular wheel portion having a plurality of spaced apertures therein, an ornamental cap having a radially extending portion provided with spaced openings, said spaced openings in said portions being adapted to align with said apertures, and a plurality of spring clip elements removably mounted in said openings of said portions and adapted to be snapped into said apertures in said wheel portion, said clip elements comprising U-shaped spring metal strips having opposite leg portions so arranged as to position the widths of said strips approximately radially of said cap for rigidly opposing radial displacement of said cap relative to said wheel portion.

7. A device comprising first and second relatively detachable parts, said first part having an aperture therein and said second part being provided with a wall portion having a rectangular opening registrable with said aperture, and at substantially U-shaped spring clip having a bight portion and a pair of opposed leg portions, said leg portions being provided with notches adjacent their open ends to facilitate insertion of said spring clip into said opening and rotation therein into a position to allow slidable engagement of said leg portions within said opening.

8. A device comprising first and second relatively detachable parts, said first part having a plurality of apertures therein and said second part being provided with a wall portion having a plurality of rectangular openings registerable with said apertures, and a plurality of substantially U-shaped spring clips each having a bight portion and a pair of opposed leg portions, said leg portions being provided with notches adjacent their open ends to facilitate insertion of said clips into said openings and rotation therein into a position to allow slidable engagement of said leg portions within said openings.

WILLIAM A. MULHERN.

REFERENCES CITED

The following references are of record in the file of this patent:

UNITED STATES PATENTS

| Number | Name | Date |
| --- | --- | --- |
| 1,943,261 | Knutson | Jan. 9, 1934 |
| 1,945,348 | Farr | Jan. 30, 1934 |
| 2,086,288 | Van Uum | July 6, 1937 |
| 2,148,160 | Hollerith | Feb. 21, 1939 |
| 2,173,524 | Van Uum | Sept. 19, 1939 |
| 2,174,087 | Horn | Sept. 26, 1939 |
| 2,208,878 | Wiley | July 23, 1940 |
| 2,279,704 | Davenport | Apr. 14, 1942 |
| 2,333,626 | Aske | Nov. 9, 1943 |
| 2,386,244 | Lyon | Oct. 9, 1945 |
| 2,470,559 | Horn | May 17, 1949 |